Jan. 9, 1934.  J. W. SANDLIN  1,942,616

VALVE MECHANISM

Filed Jan. 26, 1931

James W. Sandlin, Inventor

By Hardway Rathey, Attorneys

Patented Jan. 9, 1934

1,942,616

UNITED STATES PATENT OFFICE 1,942,616

VALVE MECHANISM

James W. Sandlin, Humble, Tex.

Application January 26, 1931. Serial No. 511,215

1 Claim. (Cl. 251—129)

This invention relates to a valve mechanism.

One object of the invention is to provide in a valve mechanism, a novel type of valve seat and a novel type of valve arranged to cooperate with said seat and having means to cause the valve to rotate back and forth during the operation thereof to cause the wear to be evenly distributed around the valve and seat to the end that the valve when seated will form a perfect contact with the seat to prevent leakage through said seat.

A further feature of the invention resides in the provision of a novel type of valve cage which affords a greater capacity for the passage of the fluid being pumped than is afforded by valve cages for a similar purpose now in common use.

A still further feature of the invention resides in the provision of a structure of the character described which is of such form as to prevent the congestion of sand about the seat when fluid containing sand or gritty substances is being pumped.

With the above and other objects in view the invention has particular relation to certain novel features of construction, operation and arrangement of parts, an example of which is given in this specification and illustrated in the accompanying drawing wherein.

Figure 1:
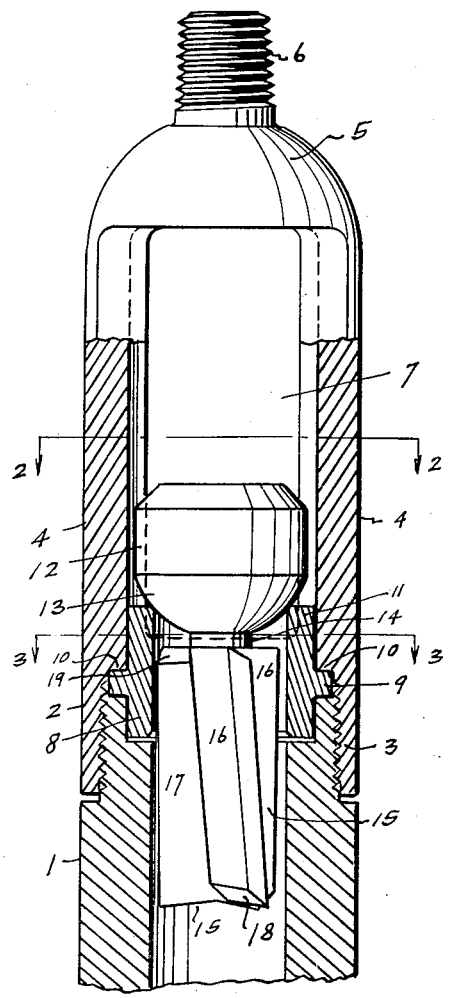
Figure 1 shows a vertical sectional view of the valve mechanism.
Figure 2:
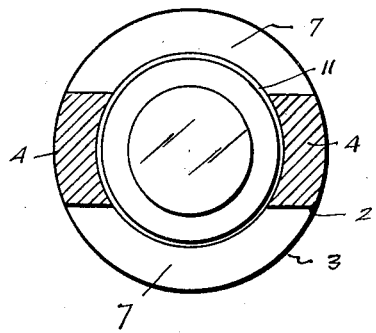
Figure 2 shows a cross sectional view taken on the line 2—2 of Figure 1.
Figure 3:
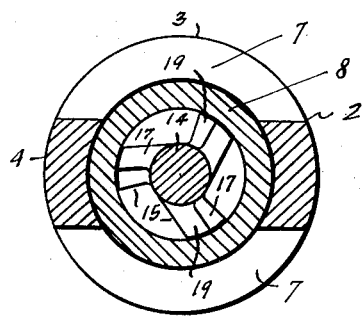
Figure 3 shows a cross sectional view taken on the line 3—3 of Figure 1.

Referring now more particularly to the drawing wherein like numerals of reference designate similar parts in each of the figures the numeral 1 designates the body of the valve mechanism which is tubular in form and whose upper end is reduced and externally threaded and screwed on to said reduced end is the valve cage 2. This cage comprises the ring 3 which is screwed onto said body as above stated and the oppositely disposed side arms 4, 4 which are connected at their upper ends by the head 5 having the upstanding threaded shank 6 for connection to the operating sucker rod of conventional construction (not shown). There being only two side arms 4 ample spaces as 7, 7 are thus provided for the free passage of the fluid being pumped. There is a valve seat 8, tubular in form, and having the external rib 9 which is clamped in place between the upper end of the body and the inside annular shoulder 10 of the cage. The upper end 11 of this seat is extended upwardly above the lower ends of the fluid spaces 7, as shown in Figure 1.

Within the cage 2 there is a valve 12 which is substantially cylindrical in form having the convex lower face 13 which cooperates with said upper end of said seat and whose upper side may be of any desired contour. Depending from the valve there is a neck 14 which supports a plurality of radial wings as 15. These wings fit through the seat 8 and into the body 1 and form guides for the valve. The lateral faces 16, 17, of said wings are correspondingly inclined or spiralled to the end that as the valve is lifted by the upwardly flowing fluid it will be rotated or spun, in one direction, as the valve mechanism is moved downwardly through the fluid and will be rotated in the opposite direction upon upward movement of the valve mechanism. The lower and upper end faces 18, 19, of said wings are beveled or inclined in the same direction as the corresponding faces 16, 17 but at a greater angle to the vertical axis of the valve mechanism to the end that the rotation of the valve will be accentuated by the action of said faces 18, 19 against the fluid being pumped.

Special attention is called to the fact that the upper end of the seat 11 extends above the lower end of the spaces 7 so that the sand and grit passing up with the fluid through the seat will not congest about the upper end of the said seat but may freely pass on out through the spaces 7 and this upward extension of the seat provides ample stock for wear to the end that the valve mechanism will operate efficiently until said upper end of the seat has worn down flush with the upper end of the cage ring 3 and a valve mechanism having a long life is thus provided.

The drawing and description disclose what is now considered to be a preferred form of the invention by way of illustration only while the broad principle of the invention will be defined by the appended claim.

What I claim is:

A valve mechanism including a tubular valve body, a cage on the upper end of the body having side passageways for fluid, an annular seat in the body whose upper end is extended upwardly above the lower ends of said passageways, a valve in the cage which cooperates with said seat, and wings depending from the valve and having correspondingly inclined side faces and correspondingly inclined upper and lower end faces, the former of which end faces are spaced from the valve.

JAMES W. SANDLIN.